United States Patent [19]

Welsh et al.

[11] Patent Number: 4,629,588

[45] Date of Patent: Dec. 16, 1986

[54] METHOD FOR REFINING GLYCERIDE OILS USING AMORPHOUS SILICA

[75] Inventors: William A. Welsh, Fulton; Yves O. Parent, Sykesville, both of Md.

[73] Assignee: W. R. Grace & Co., New York, N.Y.

[21] Appl. No.: 679,348

[22] Filed: Dec. 7, 1984

[51] Int. Cl.[4] .......... C09F 5/10

[52] U.S. Cl. .......... 260/428; 423/339

[58] Field of Search .......... 260/428; 423/339

[56] References Cited

U.S. PATENT DOCUMENTS

| | | | |
|---|---|---|---|
| 1,745,952 | 2/1930 | Prutzman | 260/428 |
| 2,174,177 | 9/1939 | Kraybill et al. | 260/403 |
| 2,450,549 | 10/1948 | Greentree | 260/428 |
| 2,589,097 | 3/1952 | Lange et al. | 260/409 |
| 2,639,289 | 5/1953 | Vogel | 260/428 |
| 3,284,213 | 11/1966 | Van Akkeren . | |
| 3,397,065 | 8/1968 | Cunningham et al. . | |
| 3,619,213 | 11/1971 | Haynes . | |
| 3,669,681 | 6/1972 | Shouf et al. . | |
| 3,954,819 | 5/1976 | Husch . | |
| 3,955,004 | 5/1976 | Strauss . | |
| 3,976,671 | 8/1976 | Husch . | |
| 4,053,565 | 10/1977 | Krekeler et al. | 423/338 |
| 4,103,038 | 7/1978 | Roberts . | |
| 4,232,052 | 11/1980 | Nappen . | |
| 4,298,622 | 11/1981 | Singh et al. . | |
| 4,330,564 | 5/1982 | Friedman . | |
| 4,375,483 | 3/1983 | Shuford et al. . | |
| 4,443,379 | 4/1984 | Taylor et al. . | |

FOREIGN PATENT DOCUMENTS

| | | |
|---|---|---|
| 0108571 | 5/1984 | European Pat. Off. . |
| 228889 | 2/1926 | United Kingdom . |
| 612169 | 11/1948 | United Kingdom . |
| 1522149 | 8/1978 | United Kingdom . |
| 1564402 | 4/1980 | United Kingdom . |

OTHER PUBLICATIONS

Gutfinger, JAOCS, "Pretreatment of Soybean Oil for Physical Refining: Evaluation of Efficiency of Various Adsorbents in Removing Phospholipids and Pigments", vol. 55, pp. 8560-8659, (1978).

Tandy et al., JAOCS, "Physical Refining of Edible Oil", vol. 61, pp. 1253-1258 (1984).

Litherland (Inventor), PCT/GB81/00251, 1982.

*Primary Examiner*—Charles F. Warren
*Assistant Examiner*—Elizabeth A. Flaherty
*Attorney, Agent, or Firm*—Jill H. Krafte

[57] ABSTRACT

Adsorbents comprising amorphous silicas with effective average pore diameters of about 60 to about 5000 Angstroms are useful in processes for the removal of trace contaminants, specifically phospholipids and associated metal ions, from glyceride oils.

18 Claims, No Drawings

METHOD FOR REFINING GLYCERIDE OILS USING AMORPHOUS SILICA

BACKGROUND OF THE INVENTION

This invention relates to a method for refining glyceride oils by contacting the oils with an adsorbent capable of selectively removing trace contaminants. More specifically, it has been found that amorphous silicas of suitable porosity are quite effective in adsorbing phospholipids and associated metal containing species from glyceride oils, to produce oil products with substantially lowered concentrations of these trace contaminants. The term "glyceride oils" as used herein is intended to encompass both vegetable and animal oils. The term is primarily intended to describe the so-called edible oils, i.e., oils derived from fruits or seeds of plants and used chiefly in foodstuffs, but it is understood that oils whose end use is as non-edibles are to be included as well.

Crude glyceride oils, particularly vegetable oils, are refined by a multi-stage process, the first step of which is degumming by treatment with water or with a chemical such as phosphoric acid, citric acid or acetic anhydride. After degumming, the oil may be refined by a chemical process including neutralization, bleaching and deodorizing steps. Alternatively, a physical process may be used, including a pretreating and bleaching step and a steam refining and deodorizing step. Physical refining processes do not include a caustic refining step. State-of-the-art processes for both physical and chemical refining are described by Tandy et al. in "Physical Refining of Edible Oil," J. Am. Oil Chem. Soc., Vol. 61, pp. 1253–58 (July 1984). One object of either refining process is to reduce the levels of phospholipids, which can lend off colors, odors and flavors to the finished oil product. In addition, ionic forms of the metals calcium, magnesium, iron and copper are thought to be chemically associated with phospholipids and to negatively effect the quality of the final oil product.

The removal of phospholipids from edible oils has been the object of a number of previously proposed physical process steps in addition to the conventional chemical processes. For example, Gutfinger et al., "Pretreatment of Soybean Oil for Physical Refining: Evaluation of Efficiency of Various Adsorbents in Removing Phospholipids and Pigments," J. Amer. Oil Chem. Soc., Vol. 55, pp. 865–59 (1978), describes a study of several adsorbents, including Tonsil L80 TM and Tonsil ACC TM (Sud Chemie, A.G.), Fuller's earth, Celite TM (Johns-Manville Products Corp.), Kaoline (sic), silicic acid and Florosil (sic) TM (Floridin Co.), for removing phospholipids and color bodies from phosphoric acid degummed soybean oil. U.S. Pat. No. 3,284,213 (Van Akkeren) discloses a process using acid bleaching clay for removing phosphoric acid material from cooking oil. U.S. Pat. No. 3,955,004 (Strauss) discloses improvement of the storage properties of edible oils by contacting the oil, in solution in a non-polar solvent, with an adsorbent such as silica gel or alumina and subsequently bleaching with a bleaching earth. U.S. Pat. No. 4,298,622 (Singh et al.) discloses bleaching degummed wheat germ oil by treating it with up to 10% by weight of an adsorbent such as Filtrol TM (Filtrol Corp.), Tonsil TM, silica gel, activated charcoal or fuller's earth, at 90°–110° C. under strong vacuum.

SUMMARY OF THE INVENTION

Trace contaminants, such as phospholipids and associated metal ions, can be removed effectively from glyceride oils by adsorption onto amorphous silica. The process described herein utilizes amorphous silicas having an average pore diameter of greater than 60 Å. Further, it has been observed that the presence of water in the pores of the silica greatly improves the filterability of the adsorbent from the oil.

It is the primary object of this invention to make feasible a physical refining process by providing a method for reducing the phospholipid content of degummed oils to acceptable levels. Adsorption of phospholipids and associated contaminants onto amorphous silica in the manner described can eliminate any need to use caustic refining, thus eliminating one unit operation, as well as the need for wastewater treatment from that operation. Over and above the cost savings realized from simplification of the oil processing, the overall value of the product is increased since a significant by-product of caustic refining is aqueous soapstock, which is of very low value.

It is also intended that use of the method of this invention may reduce or potentially eliminate the need for bleaching earth steps. Reduction or elimination of the bleaching earth step will result in substantial oil conservation as this step typically results in significant oil loss. Moreover, since spent bleaching earth has a tendency to undergo spontaneous combustion, reduction or elimination of this step will yield an occupationally and environmentally safer process.

DETAILED DESCRIPTION OF THE INVENTION

It has been found that certain amorphous silicas are particularly well suited for removing trace contaminants, specifically phospholipids and associated metal ions, from glyceride oils. The process for the removal of these trace contaminants, as described in detail herein, essentially comprises the steps of selecting a glyceride oil with a phosphorous content in excess of about 1.0 ppm, selecting an adsorbent comprising a suitable amorphous silica, contacting the glyceride oil and the adsorbent, allowing the phospholipids and associated metal ions to be adsorbed, and separating the resulting phospholipid- and metal ion-depelted oil from the adsorbent. Suitable amorphous silicas for this process are those with pore diameters greater than 60 Å. In addition, silicas with a moisture content of greater than about 30% by weight exhibit improved filterability from the oil and are therefore preferred.

The process described herein can be used for the removal of phospholipids from any glyceride oil, for example, oils of soybean, peanut, rapeseed, corn, sunflower, palm, coconut, olive, cottonseed, etc. Removal of phospholipids from these edible oils is a significant step in the oil refining process because residual phosphorus can cause off colors, odors and flavors in the finished oil. Typically, the acceptable concentration of phosphorus in the finished oil product should be less than about 15.0 ppm, preferably less than about 5.0 ppm, according to general industry practice. As an illustration of the refining goals with respect to trace contaminants, typical phosphorus levels in soybean oil at various stages of chemical refining are shown in Table I. Phosphorus levels at corresponding stages in physical refining processes will be comparable.

TABLE I[1]

| Stage | Trace Contaminant Levels (ppm) P | Ca | Mg | Fe | Cu |
|---|---|---|---|---|---|
| Crude Oil | 450–750 | 1–5 | 1–5 | 1–3 | 0.03–0.05 |
| Degummed Oil | 60–200 | 1–5 | 1–5 | 0.4–0.5 | 0.02–0.04 |
| Caustic Refined Oil | 10–15 | 1 | 1 | 0.3 | 0.003 |
| End Product | 1–15 | 1 | 1 | 0.1–0.3 | 0.003 |

[1]Data assembled from the Handbook of Soy Oil Processing and Utilization, Table I, p. 14 (1980), and from FIG. 1 from Christenson, Short Course: Processing and Quality Control of Fats and Oils, presented at American Oil Chemists' Society, Lake Geneva, WI (May 5-7, 1983).

In addition to phospholipid removal, the process of this invention also removes from edible oils ionic forms of the metals calcium, magnesium, iron and copper, which are believed to be chemically associated with phospholipids. These metal ions themselves have a deleterious effect on the refined oil products. Calcium and magnesium ions can result in the formation of precipitates. The presence of iron and copper ions promote oxidative instability. Moreover, each of these metals ions is associated with catalyst poisoning where the refined oil is catalytically hydrogenated. Typical concentrations of these metals in soybean oil at various stages of chemical refining are shown in Table I. Metal ion levels at corresponding stages of physical refining processes will be comparable. Throughout the description of this invention, unless otherwise indicated, reference to the removal of phospholipids is meant to encompass the removal of associated trace contaminants as well.

The term "amorphous silica" as used herein is intended to embrace silica gels, precipitated silicas, dialytic silicas and fumed silicas in their various prepared or activated forms. Both silica gels and precipitated silicas are prepared by the destabilization of aqueous silicate solutions by acid neutralization. In the preparation of silica gel, a silica hydrogel is formed which then typically is washed to low salt content. The washed hydrogel may be milled, or it may be dried, ultimately to the point where its structure no longer changes as a result of shrinkage. The dried, stable silica is termed a xerogel. In the preparation of precipitated silicas, the destabilization is carried out in the presence of polymerization inhibitors, such as inorganic salts, which cause precipitation of hydrated silica. The precipitate typically is filtered, washed and dried. For preparation of gels or precipitates useful in this invention, it is preferred to dry them and then to add water to reach the desired water content before use. However, it is possible to initially dry the gel or precipitate to the desired water content. Dialytic silica is prepared by precipitation of silica from a soluble silicate solution containing electrolyte salts (e.g., $NaNO_3$, $Na_2SO_4$, $KNO_3$) while electrodialyzing, as described in pending U.S. patent application Ser. No. 533,206 (Winyall), "Particulate Dialytic Silica," filed Sept. 20, 1983 now U.S. Pat. No. 4,508,607 issued Apr. 2, 1985. Fumed silicas (or pyrogenic silicas) are prepared from silicon tetrachloride by high-temperature hydrolysis, or other convenient methods. The specific manufacturing process used to prepare the amorphous silica is not expected to affect its utility in this method.

In the preferred embodiment of this invention, the silica adsorbent will have the highest possible surface area in pores which are large enough to permit access to the phospholipid molecules, while being capable of maintaining good structural integrity upon contact with an aqueous media. The requirement of structural integrity is particularly important where the silica adsorbents are used in continuous flow systems, which are susceptible to disruption and plugging. Amorphous silicas suitable for use in this process have surface areas of up to about 1200 square meters per gram, preferably between 100 and 1200 square meters per gram. It is preferred, as well, for as much as possible of the surface area to be contained in pores with diameters greater than 60 Å.

The method of this invention utilizes amorphous silicas with substantial porosity contained in pores having diameters greater than about 60 Å, as defined herein, after appropriate activation. Activation typically is by heating to temperatures of about 450° to 700° F. in vacuum. One convention which describes silicas is average pore diameter ("APD"), typically defined as that pore diameter at which 50% of the surface area or pore volume is contained in pores with diameters greater than the stated APD and 50% is contained in pores with diameters less than the stated APD. Thus, in amorphous silicas suitable for use in the method of this invention, at least 50% of the pore volume will be in pores of at least 60 Å diameter. Silicas with a higher proportion of pores with diameters greater than 60 Å will be preferred, as these will contain a greater number of potential adsorption sites. The practical upper APD limit is about 5000 Å.

Silicas which have measured intraparticle APDs within the stated range will be suitable for use in this process. Alternatively, the required porosity may be achieved by the creation of an artificial pore network of interparticle voids in the 60 to 5000 Å range. For example, non-porous silicas (i.e., fumed silica) can be used as aggregated particles. Silicas, with or without the required porosity, may be used under conditions which create this artificial pore network. Thus the criterion for selecting suitable amorphous silicas for use in this process is the presence of an "effective average pore diameter" greater than 60 Å. This term includes both measured intraparticle APD and interparticle APD, designating the pores created by aggregation or packing of silica particles.

The APD value (in Angstroms) can be measured by several methods or can be approximated by the following equation, which assumes model pores of cylindrical geometry:

$$APD\,(\text{Å}) = \frac{40{,}000 \times PV\,(\text{cc/gm})}{SA\,(\text{m}^2/\text{gm})}, \quad (1)$$

where PV is pore volume (measured in cubic centimeters per gram) and SA is surface area (measured in square meters per gram).

Both nitrogen and mercury porosimetry may be used to measure pore volume in xerogels, precipitated silicas and dialytic silicas. Pore volume may be measured by the nitgrogen Brunauer-Emmett-Teller ("B-E-T") method described in Brunauer et al., J. Am. Chem. Soc., Vol 60, p. 309 (1938). This method depends on the condensation of nitrogen into the pores of activated silica and is useful for measuring pores with diameters up to about 600 Å. If the sample contains pores with diameters greater than about 600 Å, the pore size distribution, at least of the larger pores, is determined by mercury porosimetry as described in Ritter et al., Ind. Eng. Chem. Anal. Ed. 17,787 (1945). This method is based on determining the pressure required to force mercury into the pores of the sample. Mercury porosimetry, which is useful from about 30 to about 10,000 A, may be used alone for measuring pore volumes in silicas having pores with diameters both above and below 600 Å. Alternatively, nitrogen porosimetry can be used in conjunction with mercury porosimetry for these silicas. For measurement of APDs below 600 Å, it may be desired to compare the results obtained by both methods. The calculated PV volume is used in Equation (1).

For determining pore volume of hydrogels, a different procedure, which assumes a direct relationship between pore volume and water content, is used. A sample of the hydrogel is weighed into a container and all water is removed from the sample by vacuum at low temperatures (i.e., about room temperature). The sample is then heated to about 450° to 700° F. to activate. After activation, the sample is re-weighed to determine the weight of the silica on a dry basis, and the pore volume is calculated by the equation:

$$PV\,(\text{cc/gm}) = \frac{\%\ TV}{100 - \%\ TV}, \quad (2)$$

where TV is total volatiles, determined by the wet and dry weight differential. The PV value calculated in this manner is then used in Equation (1).

The surface area measurement in the APD equation is measured by the nitrogen B-E-T surface area method, described in the Brunauer et al., article, supra. The surface area of all types of appropriately activated amorphous silicas can be measured by this method. The measured SA is used in Equation (1) with the measured PV to calculate the APD of the silica.

In the preferred embodiment of this invention, the amorphous silica selected for use will be a hydrogel. The characteristics of hydrogels are such that they effectively adsorb trace contaminants from glyceride oils and that they exhibit superior filterability as compared with other forms of silica. The selection of hydrogels therefore will facilitate the overall refining process.

The purity of the amorphous silica used in this invention is not believed to be critical in terms of the adsorption of phospholipids. However, where the finished products are intended to be food grade oils care should be taken to ensure that the silica used does not contain leachable impurities which could compromise the desired purity of the product(s). It is preferred, therefore, to use a substantially pure amorphous silica, although minor amounts, i.e., less than about 10%, of other inorganic constituents may be present. For example, suitable silicas may comprise iron as $Fe_2O_3$, aluminum as $Al_2O_3$, titanium as $TiO_2$, calcium as CaO, sodium as $Na_2O$, zirconium as $ZrO_2$, and/or trace elements.

It has been found that the moisture or water content of the silica has an important effect on the filterability of the silica from the oil, although it does not necessarily affect phospholipid adsorption itself. The presence of greater than 30% by weight of water in the pores of the silica (measured as weight loss on ignition at 1750° F.) is preferred for improved filterability. This improvement in filterability is observed even at elevated oil temperatures which would tend to cause the water content of the silica to be substantially lost by evaporation during the treatment step.

The adsorption step itself is accomplished by conventional methods in which the amorphous silica and the oil are contacted, preferably in a manner which facilitates the adsorption. The adsorption step may be by any convenient batch or continuous process. In any case, agitation or other mixing will enhance the adsorption efficiency of the silica.

The adsorption can be conducted at any convenient temperature at which the oil is a liquid. The glyceride oil and amorphous silica are contacted as described above for a period sufficient to achieve the desired phospholipid content in the treated oil. The specific contact time will vary somewhat with the selected process, i.e., batch or continuous. In addition, the adsorbent usage, that is, the relative quantity of adsorbent brought into contact with the oil, will affect the amount of phospholipids removed. The adsorbent usage is quantified as the weight percent of amorphous silica (on a dry weight basis after ignition at 1750° F.), calculated on the weight of the oil processed. The preferred adsorbent usage is about 0.01 to about 1.0%.

As seen in the Examples, significant reduction in phospholipid content is achieved by the method of this invention. The specific phosphorus content of the treated oil will depend primarily on the oil itself, as well as on the silica, usage, process, etc. However, phosphorus levels of less than 15 ppm, preferably less than 5.0 ppm, can be achieved.

Following adsorption, the phospholipid-enriched silica is filtered from the phospholipid-depleted oil by any convenient filtration means. The oil may be subjected to additional finishing processes, such as steam refining, heat bleaching and/or deodorizing. The method described herein may reduce the phosphorus levels sufficiently to eliminate the need for bleaching earth steps. With low phosphorus levels, it may be feasible to use heat bleaching instead. Even where bleaching earth operations are to be employed for decoloring the oil, the sequential treatment with amorphous silica and bleaching earth provides an extremely efficient overall process. By first using the method of this invention to decrease the phospholipid content, and then treating with bleaching earth, the latter step is made to be more effective. Therefore, either the quantity of bleaching earth required can be significantly reduced, or the bleaching earth will operate more effectively per unit weight. It may be feasible to elute the adsorbed contaminants from the spent silica in order to re-cycle the silica for further oil treatment.

The examples which follow are given for illustrative purposes and are not meant to limit the invention described herein. The following abbreviations have been used throughout in describing the invention:

Å—Angstrom(s)
APD—average pore diameter
B-E-T—Brunauer-Emmett-Teller
Ca—calcium
cc—cubic centimeter(s)
cm—centimeter
Cu—copper
°C.—degrees Centigrade
°F.—degrees Fahrenheit
Fe—iron
gm—gram(s)
ICP—Inductively Coupled Plasma
m—meter
Mg—magnesium
min—minutes
ml—milliliter(s)
P—phosphorus
ppm—parts per million
%—percent PV—pore volume
RH—relative humidity
SA—surface area
sec—seconds
TV—total volatiles
wt—weight

EXAMPLE I

(Amorphous Silicas Used)

The silicas used in the following Examples are listed in Table II, together with their relevant properties. Four samples of typical degummed soybean oil were analyzed by inductively coupled plasma ("ICP") emission spectroscopy for trace contaminants. The results are shown in Table III.

TABLE II

| Silica Sample No. | Surface Area[1] | Pore Volume[2] | Av. Pore Diameter[3] | Total Volatiles[4] |
|---|---|---|---|---|
| Xerogels[5] | | | | |
| 1 | 998 | 0.86 | 35 | 4.2 |
| 2 | 750 | 0.43 | 20 | 5.3 |
| 3 | 560 | 0.86 | 61 | 11.4 |
| 4 | 676 | 1.65 | 98 | 6.2 |
| 5 | 340 | 1.10 | 130 | 9.0 |
| 6 | 250 | 1.90 | 304 | 3.6 |
| 13 | 750 | 0.43 | 20 | 5.3 |
| 14 | 560 | 0.86 | 61 | 11.4 |
| 15 | 676 | 1.65 | 98 | 6.2 |
| 16 | 340 | 1.10 | 130 | 9.0 |
| 17 | 250 | 1.90 | 304 | 3.6 |
| Hydrogels[6] | | | | |
| 7 | 911 | 1.82 | 80 | 64.5 |
| 8 | 533 | 1.82 | 137 | 64.6 |
| Precipitates[7] | | | | |
| 9 | 156 | 1.43 | 368 | 11.8 |
| 10 | 206 | 1.40 | 272 | 8.9 |
| 11 | 197 | 1.04 | 212 | 8.5 |
| Fumed[8] | | | | |
| 12 | 200 | (no PV) | (no APD) | 4.1 |
| Dialytic[9] | | | | |
| 18 | 260 | 3.64 | 230 | 2.9 |
| 19 | 16 | 0.48 | 2500 | 2.5 |

[1]B-E-T surface area (SA) measured as described above.
[2]Pore volume (PV) measured as described above using nitrogen porosimetry for xerogels and precipitates, hydrogel method as described, and for dialytic silicas using mercury porosimetry and selecting average pore diameter at the peak observed in a plot of d(Volume)/d (log Diameter) vs. log Pore Diameter.
[3]Average pore diameter (APD) calculated as described above.
[4]Total volatiles, in wt. %, on ignition at 1750° F.
[5]Xerogels were obtained from the Davison Chemical Division of W. R. Grace & Co.
[6]Hydrogels were obtained from the Davison Chemical Division of W. R. Grace & Co.
[7]Precipitate sources: #9 was obtained from PPG Industries, #10 and #11 were obtained from Degussa, Inc.
[8]Fumed silica (Cab-O-Sil M-5 (TM)) was obtained from Cabot Corp.
[9]Dialytic silicas were obtained from the Davison Chemical Division of W. R. Grace & Co.

TABLE III

| Oil[1] | Trace Contaminant Levels (ppm)[2] P | Ca | Mg | Fe | Cu[3] |
|---|---|---|---|---|---|
| A | 17.0 | 1.73 | 1.02 | 0.23 | 0.006 |
| B | 230.0 | 38.00 | 20.00 | 0.59 | 0.025 |
| C | 18.3 | 10.50 | 4.03 | 0.31 | 0.004 |
| D | 2.4 | 0.14 | 0.12 | 1.00 | 0.012 |

[1]Oils obtained were described as degummed soybean oils.
[2]Trace contaminant levels measured in parts per million versus standards by ICP emission spectroscopy.
[3]Copper values reported were near the detection limits of this analytical technique.

EXAMPLE II

(Treatment of Oil A with Various Silicas)

Oil A (Table III) was treated with several of the silicas listed in Table II. For each test, a volume of Oil A was heated to 100° C. and the test silica was added in the amount indicated in the second column of Table IV. The mixture was maintained at 100° C. with vigorous stirring for 0.5 hours. The silica was separated from the oil by filtration. The treated, filtered oil samples were analyzed for trace contaminant levels (in ppm) by ICP emission spectroscopy. The results, shown in Table IV, demonstrate that the effectiveness of the silica samples in removing phospholipids from this oil is correlated to average pore diameter.

TABLE IV

| Silica[1] | Wt %[2] | APD[3] | Trace Contaminant Levels (ppm)[4] P | Ca | Mg | Fe | Cu[5] |
|---|---|---|---|---|---|---|---|
| 3 | 0.53 | 61 | 10.94 | 1.55 | 0.89 | 0.20 | 0.000 |
| 4 | 0.56 | 98 | 0.46 | 0.02 | 0.00 | 0.00 | 0.002 |
| 6 | 0.57 | 30 | 0.66 | 0.29 | 0.01 | 0.01 | 0.002 |
| 7 | 0.30 | 80 | 0.72 | 0.00 | 0.00 | 0.00 | 0.000 |
| 8 | 0.60 | 137 | 0.50 | 0.11 | 0.00 | 0.00 | 0.000 |
| 9 | 0.53 | 368 | 0.14 | 0.21 | 0.11 | 0.08 | — |
| 10 | 0.55 | 272 | 0.68 | 0.10 | 0.04 | 0.06 | — |
| 11 | 0.55 | | 0.13 | 0.09 | 0.04 | 0.07 | — |
| 12 | 0.58 | — | 0.00 | 0.10 | 0.04 | 0.04 | — |

[1]Silica numbers refer to those listed in Table II.
[2]Adsorbent usage is weight % of silica (on a dry basis at 1750° F.) in the oil sample.
[3]APD = average pore diameter (Table II).
[4]Trace contaminant levels measured versus standards by ICP mission spectroscopy.
[5]Copper values reported were near the detection limits of this analytical technique.

EXAMPLE III

(Treatment of Oil B with Various Silicas)

Oil B (Table III) was treated with several of the silicas listed in Table II according to the procedure described in Example II. Samples 13-17 were all a uniform particle size of 100-200 mesh (U.S.). The results, shown in Table V, demonstrate that the effectiveness of the silica samples in removing phospholipids from this oil was correlated to average pore diameter.

TABLE V

| Silica[1] | Wt %[2] | APD[3] | Trace Contaminant Levels (ppm)[4] P | Ca | Mg | Fe | Cu[5] |
|---|---|---|---|---|---|---|---|
| 1 | 0.3 | 35 | 212 | 30.3 | 16.7 | 0.49 | 0.028 |
| 5 | 0.6 | 130 | 79 | 16.2 | 8.5 | 0.27 | 0.005 |
| 5 | 0.3 | 130 | 152 | 30.7 | 16.8 | 0.46 | 0.011 |
| 7 | 0.3 | 80 | 22.5 | 0.62 | 0.30 | 0.00 | — |
| 8 | 0.3 | 137 | 24.5 | 0.45 | 0.22 | 0.00 | 0.003 |
| 9 | 0.3 | 368 | 156 | 19.10 | 10.9 | 0.31 | 0.003 |
| 10 | 0.6 | 272 | 101 | 22.40 | 12.5 | 0.36 | 0.012 |
| 12 | 0.6 | — | 36 | 3.05 | 1.75 | 0.03 | 0.002 |
| 13 | 0.6 | 20 | 155 | 20.80 | 11.1 | 0.16 | 0.021 |
| 14 | 0.6 | 61 | 127 | 16.50 | 8.8 | 0.09 | 0.021 |
| 15 | 0.6 | 98 | 90 | 12.40 | 6.7 | 0.07 | 0.024 |
| 16 | 0.6 | 130 | 91 | 12.40 | 6.7 | 0.09 | 0.027 |
| 17 | 0.6 | 304 | 55 | 5.38 | 2.8 | 0.00 | 0.019 |
| 18 | 0.6 | 230 | 26.5 | 0.364 | 0.01 | 0.00 | 0.015 |
| 19 | 0.6 | 2500 | 74 | 7.51 | 3.75 | 0.03 | 0.030 |

[1]Silica numbers refer to those listed in Table II.
[2]Adsorbent usage is weight % of silica (on a dry basis at 1750° F.) in oil sample.
[3]APD = average pore diameter (Table II).
[4]Trace contaminant levels measured versus standards by ICP emission spectroscopy.
[5]Copper values reported were near the detection limits of this analytical technique.

EXAMPLE IV

(Treatment of Oil C with Various Silicas)

Oil C (Table III) was treated with several of the silicas listed in Table II according to the procedures described in Example II.. The results, shown in Table VI, demonstrate that the effectiveness of the silica samples in removing phospholipids from this oil is correlated to average pore diameter.

TABLE VI

| Silica[1] | Wt %[2] | APD[3] | Trace Contaminant Levels (ppm)[4] P | Ca | Mg | Fe | Cu[5] |
|---|---|---|---|---|---|---|---|
| 1 | 0.3 | 35 | 14.0 | 8.30 | 3.52 | 0.274 | 0.004 |
| 5 | 0.3 | 130 | 8.1 | 5.40 | 2.10 | — | 0.001 |
| 7 | 0.3 | 80 | 5.3 | 3.73 | 1.49 | 0.090 | 0.003 |
| 9 | 0.3 | 368 | 4.3 | 3.30 | 1.28 | 0.130 | 0.003 |

[1]Silica numbers refer to those listed in Table II.
[2]Adsorbent usage is weight % of silica (on a dry basis at 1750° F.) in the oil sample.
[3]APD = average pore diameter (Table II).
[4]Trace contaminant levels measured versus standards by ICP emission spectroscopy.
[5]Copper values reported were near the detection limits of this analytical technique.

EXAMPLE V (Filtration Rate Studies in Soybean Oil)

The practical application of the adsorption of phospholipids onto amorphous silicas as described herein includes the process step in which the silica is separated from the oil, permitting recovery of the oil product. The procedures of Example II were repeated, using Oils B or D (Table III) with various silicas (Table II), as indicated in Table VII. Silicas 5A and 9A (Table VII) are wetted versions of silicas 5 and 9 (Table II), respectively, and were prepared by wetting the silicas to incipient wetness and drying to the % total volatiles indicated in Table VIII. The filtration was conducted by filtering 50.0 gm oil containing either 0.4 wt.% (dry basis silica) (for the 25° C. oil samples) or 0.3 wt.% (dry basis silica) (for the 100° C. oil samples) through a 5.5 cm diameter Whatman #1 paper at constant pressure. The results, shown in Table VII, demonstrate that silicas with total volatiles levels of over 30 wt.% exhibited significantly improved filterability, in terms of decreased time required for the filtration.

TABLE VIII

| Silica[1] | Total Volatiles[2] | Oil[3] | Oil Temp.[4] | Filtration Time[5] |
|---|---|---|---|---|
| 5 | 9.0 | D | 25 | 25:01 |
| 5A | 36.3 | D | 25 | 7:20 |
| 7 | 64.6 | D | 25 | 3:14 |
| 5 | 9.6 | D | 100 | 4:55 |
| 7 | 64.5 | D | 100 | 0:23 |
| 7 | 64.5 | B | 100 | 0:54 |
| 8 | 64.6 | B | 100 | 2:06 |
| 9 | 11.8 | B | 100 | 17:56 |
| 9A | 31.0 | B | 100 | 3:00 |

[1]Silica numbers refer to those listed in Table II.
[2]Total volatiles, in weight %, on ignition at 1750° F.
[3]Oil letters refer to those listed in Table III.
[4]Oil temperature is in °C.
[5]Filtration time is min:sec.

EXAMPLE VII (Treatment of Oil C at Various Temperatures)

The procedures of Example II were repeated, using Oil C (Table III) and silicas 5 and 7 (Table II), and heating the oil samples to the temperatures indicated in Table IX. The results, shown in Table IX, demonstrate the effectiveness of the process of this invention at temperatures of 25° to 100° C.

TABLE IX

| Silica[1] | Wt %[2] | Oil[3] Temp[3] | Trace Contaminant Levels (ppm)[4] P | Ca | Mg | Fe |
|---|---|---|---|---|---|---|
| 5 | 0.3 | 25 | 6.1 | 4.9 | 1.7 | 0.15 |
| 5 | 0.3 | 50 | 10.0 | 6.5 | 2.6 | 0.23 |
| 5 | 0.3 | 70 | 8.3 | 6.1 | 2.4 | 0.21 |
| 5 | 0.3 | 100 | 8.1 | 5.4 | 2.1 | 0.09 |

TABLE IX-continued

| Silica[1] | Wt %[2] | Oil[3] Temp[3] | Trace Contaminant Levels (ppm)[4] P | Ca | Mg | Fe |
|---|---|---|---|---|---|---|
| 7 | 0.3 | 50 | 4.4 | 3.4 | 1.3 | 0.10 |
| 7 | 0.3 | 70 | 4.4 | 3.4 | 1.3 | 0.10 |
| 7 | 0.3 | 100 | 6.5 | 4.4 | 1.7 | 0.13 |

[1]Silica numbers refer to those listed in Table II.
[2]Adsorbent usage in weight % of silica (on a dry basis at 1750° F.) in the oil sample.
[3]Oil temperature is in °C.
[4]Trace contaminant levels measured versus standards by ICP emission spectroscopy.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A process for the removal of trace contaminants, which are phospholipids and associated metal ions, from glyceride oils by adsorbing said trace contaminants onto amorphous silica to yield glyceride oils having 15.0 ppm or less of phosphorus present as phospholipids, comprising:
   (a) selecting a glyceride oil with a phosphorus content in excess of about 1.0 ppm,
   (b) selecting an adsorbent consisting of an amorphous silica which has an effective average pore diameter of greater than 60 Angstroms,
   (c) contacting the glyceride oil of step (a) and the adsorbent of step (b),
   (d) allowing said trace contaminants to be adsorbed onto said adsorbent, and
   (e) separating the resulting phospholipid- and metal ion-depleted glyceride oil from the adsorbent.

2. The process of claim 1 in which said glyceride oil is degummed oil comprising about up to about 200 parts per million phosphorus.

3. The process of claim 1 in which said glyceride oil is soybean oil.

4. The process of claim 1 in which said average pore diameter is between 60 and about 5000 Angstroms.

5. The process of claim 1 in which at least 50% of the pore volume of said amorphous silica is contained in pores of at least 60 Angstroms in diameter.

6. The process of claim 1 in which said amorphous silica is utilized in such a manner as to create an artificial pore network of interparticle voids having diameters of greater than 60 Angstroms.

7. The process of claim 6 in which said amorphous silica is fumed silica.

8. The process of claim 1 in which said amorphous silica is selected from the group consisting of silica gels, precipitated silicas, dialytic silicas, and fumed silicas.

9. The process of claim 8 in which said silica gel is a hydrogel.

10. The process of claim 8 in which the water content of said amorphous silica is greater than 30% by weight.

11. The process of claim 1 in which said amorphous silica has a surface area of up to about 1200 square meters per gram.

12. The process of claim 1 in which said amorphous silica comprises minor amounts of inorganic constituents.

13. An improved process for the refining of glyceride oil, which process comprises the steps of degumming, phospholipid removal, bleaching and deodorizing, the improvement comprising removing phospholipids by contacting said glyceride oil with amorphous silica having an effective average pore diameter of about 60 to about 5000 Angstroms.

14. The improved process of claim 13 in which said glyceride oil is soybean oil.

15. The improved process of claim 13 in which at least 50% of the pore volume of said amorphous silica is contained in pores of at least 60 Angstroms in diameter.

16. The improved process of claim 13 in which said amorphous silica is selected from the group consisting of silica gels, precipitated silicas, dialytic silicas and fumed silicas.

17. The improved process of claim 13 which the water content of said amorphous silica is greater than 30% by weight.

18. A sequential treatment process for decreasing the phospholipid content of and decolorizing glyceride oils, comprising first treating said glyceride oil by contacting with amorphous silica having an effective average pore diameter of about 60 to 5000 Angstroms and next treating the phospholipid-depleted glyceride oil with bleaching earth.

* * * * *